J. O. WADDELL.
Fauçet.
No. 200,416. Patented Feb. 19, 1878.
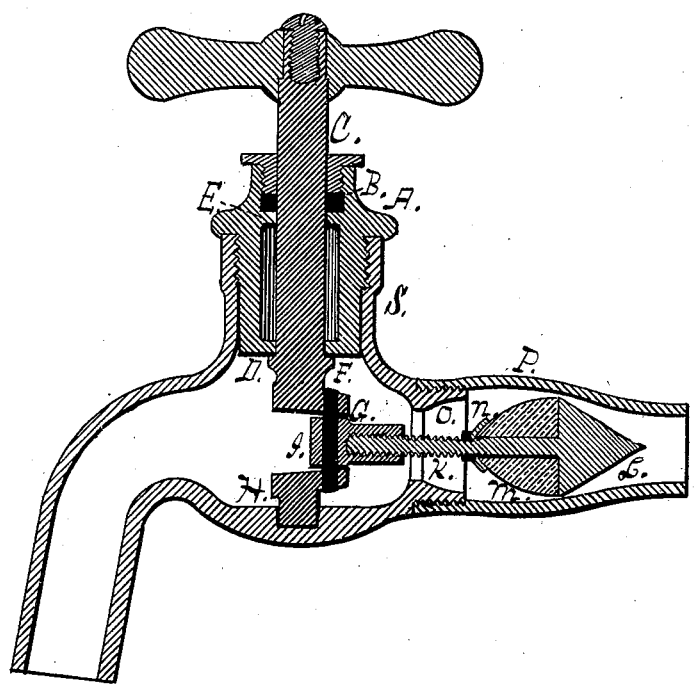
WITNESSES,
A. C. Jenkins
B. Maguire
INVENTOR.
James O. Waddell
By Horace Harris Atty.

UNITED STATES PATENT OFFICE.

JAMES O. WADDELL, OF NEWARK, NEW JERSEY.

IMPROVEMENT IN FAUCETS.

Specification forming part of Letters Patent No. 200,416, dated February 19, 1878; application filed December 24, 1877.

*To all whom it may concern:*

Be it known that I, JAMES O. WADDELL, of Newark, in the county of Essex and State of New Jersey, have invented a new and useful Improvement in Faucets, which improvement is fully set forth in the following specification and accompanying drawings, in which the figure is a sectional elevation.

The object of my invention in the construction of a faucet is to secure increased simplicity and durability in the use of the mechanism herein set forth; and for this purpose I construct an extension-cap, A, and a stuffing-box, B, for a guide, and for receiving and holding the operating-shaft C in position.

The cap is made detachable from the faucet S, and is hollow, having the bearing D at the lower end, and the bearing E near the upper end, but below, and forming the bottom of the stuffing-box.

The bearing D accomplishes the double purpose of a guide for the shaft C and of forming a breast for the collar F of the shaft. This shaft is made with a straight upper end, and the collar is made to fit up against the breast of the cap—the bearing D—for holding the shaft in position.

The lower end of the shaft is fitted with a crank, G, which terminates with a center-pin, H, resting in a bearing in the bottom of the faucet.

The sleeve I is secured around the crank-pin, having its projecting end threaded to receive the stem K of the pointed flange L, the flange and stem being made in one continuous piece. Before the stem is inserted in the sleeve there is slipped on it, up against the shoulder of the flange, a rubber ball or half-ball, or cone-shaped rubber, *m*, for a valve, which is held in position by the nut *n*, and has a valve-seat, *o*, at the screw-junction of the shank P with the faucet.

In this construction of a faucet I have secured great simplicity of parts, with perfect bearings for the shaft, and all at a reduced cost. Therefore,

What I claim as my invention, and desire to secure by Letters Patent, is—

1. In the faucet, the shaft C, having the crank G, and incased in the threaded sleeve I, substantially as and for the purpose set forth.

2. In combination with the shaft C, having the crank G and the threaded sleeve I, the pointed flange L and stem K, being made in one continuous piece and fitted to screw into the sleeve I, substantially as and for the purpose sat forth.

JAMES O. WADDELL.

Witnesses:
HORACE HARRIS.
A. C. JENKINS.